United States Patent
Yoshida et al.

(10) Patent No.: US 7,297,908 B2
(45) Date of Patent: Nov. 20, 2007

(54) REMOVING METHOD OF TUBE

(75) Inventors: Hirotaka Yoshida, Kawasaki (JP);
Michio Sato, Kawasaki (JP); Yuji Kurokawa, Kawasaki (JP)

(73) Assignee: Dai-Ichi High Frequency Co., Ltd., Tokyo (JP)

( * ) Notice: Subject to any disclaimer, the term of this patent is extended or adjusted under 35 U.S.C. 154(b) by 278 days.

(21) Appl. No.: 11/100,568

(22) Filed: Apr. 7, 2005

(65) Prior Publication Data

US 2005/0235473 A1    Oct. 27, 2005

(30) Foreign Application Priority Data

Apr. 22, 2004   (JP)   .............. 2004-126278

(51) Int. Cl.
*H05B 6/10* (2006.01)
(52) U.S. Cl. ..................... 219/635; 29/426.4
(58) Field of Classification Search ............ 219/635, 219/634, 643; 29/426.2, 890.031, 426.4, 29/426.5, 426.1, 890.49, 897.1, 890.038, 29/890.043, 402.06, 402.08; 156/143, 272.2, 156/76; 428/35.7, 36.4, 36.9
See application file for complete search history.

(56) References Cited

U.S. PATENT DOCUMENTS 3,492,453 A * 1/1970 Hurst ..................... 219/632
3,986,245 A * 10/1976 Savor et al. ......... 29/890.031
4,421,160 A * 12/1983 Stafford et al. .......... 165/76

* cited by examiner

*Primary Examiner*—Quang Van
(74) *Attorney, Agent, or Firm*—Westerman, Hattori, Daniels & Adrian, LLP

(57) ABSTRACT

The present invention provides a removing method of a tube. Upon removing a tube 3 increased in diameter and fixed to a tube-sheet 1, an inserted portion 3a which is fixed to a tube-hole 2 of the tube-sheet 1 is heated and then cooled, thereby reducing its diameter. The inserted portion 3a is loosened from the tube-hole 2. Then, a region 3h opposed to a groove 4 formed in an inner circumference of the tube-hole is heated to a red-hot state, and the tube 3 is stretched in its axial direction, the red-heated region 3h is stretched to reduce its diameter and cut the region 3h, thereby pulling out the tube 3 from the tube-sheet 1.

7 Claims, 4 Drawing Sheets

REMOVING METHOD OF TUBE

TECHNICAL FIELD

The present invention relates to a method for a pulling out a large number of boiler tubes, disposed between a steam drum and a water drum of a steam boiler, from the steam drum or the water drum and removing the boiler tubes, and the invention relates to a method for pulling out a large number of heat-exchange tubes connected to a tube plate of a shell-tube type heat exchanger from the tube plate and removing the heat-exchange tubes. More particularly, the invention relates to a method for pulling out tubes such as boiler tubes and heat-exchange tubes from a tube-sheet. The tube-sheet is a member such as a shell plate of the steam drum, a shell plate of the water drum and a tube plate of the heat exchanger which fixes the tube.

BACKGROUND OF THE INVENTION

Generally, a tube is provided in a steam boiler or a heat exchanger, and one end of the tube is inserted into a hole formed in a tube-sheet ("tube-hole", hereinafter), and fixed therein. In many cases, the tube is fixed to the tube-sheet in the following manner as shown in FIG. 4. That is, a tube-hole 2 is formed in a tube-sheet 1, and an end of a tube 3 is inserted into the tube-hole 2. The tube 3 includes a region 3b including an inserted portion 3a located in the tube-hole 2. A diameter of the region 3b is increased so that the inserted portion 3a is fixed to the tube-hole 2. A tip end of the tube 3 is flared to form a flare portion 3c.

Diameters of diameter-increased portions 3d and 3e are increased as compared with an inner diameter of the tube-hole 2 by a diameter-increasing operation. The diameter-increased portions 3d and 3e are formed outside of the tube-sheet 1 in many cases. Further, as shown in FIG. 5, one or more annular grooves 4 are formed on the inner circumference of the tube-hole 2, and when the diameter-increasing operation is carried out, a diameter-increased portion 3f is generated at a location corresponding to the groove 4, thereby establishing stronger engagement in many cases.

When the tube 3 is rusted or damaged, it is necessary to pull out the tube 3 from the tube-sheet 1 and replace the same. A conventional method for pulling out the tube 3 is as follows. That is, the inserted portion 3a which is diameter-increased and fixed is rapidly heated by a gas torch or induction heating from the inner side, the inserted portion 3a which trends to thermally expand is restrained by the inner circumference of the tube-hole 2 to bring the inserted portion 3a into a compressive yield state, and after the inserted portion 3a is cooled, the diameter thereof is reduced (heating and diameter-reducing operation) to loosen the inserted portion 3a with respect to the tube-hole 2 and then, the tube 3 is pulled out into a direction of the arrow A or B.

When the tube 3 is pulled out, a portion of the tube 3 is cut off at an appropriate right side location (in FIGS. 4 and 5) from the tube-sheet 1, besides, when the tube 3 is pulled out in the direction of the arrow A, since the flare portion 3c or the diameter-increased portion 3d is caught by the tube-hole 2, these portions are ground by a grinder, or flare portion 3c is divided in circular direction to three petal-like portions by gas torch-cutting without damaging the tube-sheet and then shrunk by hammering. When the tube 3 is pulled out in the direction of the arrow B, since the diameter-increased portion 3e is caught in the tube-hole 2, the same operation is carried out for the diameter-increased portion 3e.

However, the diameter-reducing ratio of the inserted portion 3a by the aforementioned heat-and-cool loosening operation is about 1% at the most, and in the operation it is necessary to restrain the outer surface of the tube, and thus, when the groove 4 is formed on the inner circumference of the tube-hole 2 as shown in FIG. 5, the diameter of the diameter-increased portion 3f existing in the groove 4 is not reduced so much, and it is almost impossible to reduce its diameter to a value smaller than the inner diameter of the tube-hole 2. For this reason, according to the structure having the groove 4, the diameter-increased portion 3f is caught in the side wall of the groove 4 and the diameter-increased portion 3f can not be pulled out in many cases.

In such a case, the region 3b of the tube 3 whose diameter is increased is divided in the axial direction of the tube by gas torch cutting and then is shrunk by the hammer or the like, and thus, the operation becomes complicated, and there is a problem that the tube-sheet 1 is damaged at the cutting in many cases, and high costs are required for repairing the damage. Further, when the flare portion 3c or the diameter-increased portions 3d and 3e are ground or cut, there is a problem that the tube-sheet is damaged in many cases and high costs are required for repairing the damage.

As a method for solving such problems, the present assignee has developed a method for pulling out the tube from the tube-sheet (see Patent document 1). In this method, a narrow section of one end of a region of the tube whose diameter is increased is heated into a red-hot state, and a tractive force is applied to the tube end, thereby tensile-yielding the narrow section in the red-hot state to reduce its diameter, and the same operation is carried out for the adjacent narrow sections, and the same operation is repeatedly carried out while moving the positions of the red heated narrow sections one after another, thereby reducing the diameter substantially of the entire diameter-increasing region including the diameter-increased portions 3d, 3e and 3f to pull out the tube from the tube-sheet (Patent document 1). According to this method, it is possible to increase the diameter-reducing amount, and there is a merit that the tube can easily be pulled out. However, this method has a demerit that since the operation for red-heating the narrow section to cause the tensile yield and to reduce the diameter is carried out repeatedly while changing the positions, the much labor is required for the operation and it takes time for the operation.

Japanese Patent Application Laid-open No. H8-229749

SUMMARY OF THE INVENTION

The present invention has been accomplished in view of the above circumstances, and it is an object of the invention to provide a removing method of a tube in which it is possible to easily pull out and remove, within a short time, the tube which is inserted into a tube-hole, having an annular groove on its inner circumference, of the tube-sheet and which is increased in diameter and fixed thereto, without damaging the tube-sheet.

To achieve the above object, the first aspect of the present invention provides a removing method for removing a tube which is inserted into a tube-hole, having an annular groove formed on its inner circumference, of a tube-sheet, and which is increased in diameter and fixed to the tube-hole, wherein the inserted portion of the tube which is inserted into the tube-hole and fixed thereto is heated and then cooled, thereby reducing its diameter and the inserted portion is loosened from the tube-hole, then a region of the tube opposed to the groove is heated to a red-hot state, the tube is stretched in its axial direction, the red heated region is stretched and reduced in diameter and cut off, the tube is pulled out from the tube-sheet.

According to the second aspect of the present invention, in the removing method, the operation for heating the region of the tube opposed to the groove into the red-hot state is carried out by a method in which an induction heating coil is disposed in the tube and the tube is induction heated by supplying alternating current to the induction heating coil.

According to the third aspect of the present invention, in the removing method, when a plurality of annular grooves are formed on the inner circumference of the tube-hole, a region of the tube opposed to the grooves are simultaneously heated to the red-hot state.

According to the fourth aspect of the present invention, in the removing method, when the tube is stretched in its axial direction, a tractive force is applied to a portion of the tube which is located on a side opposed from a tip end of the tube with respect to the tube-sheet.

DETAIL DESCRIPTION OF THE INVENTION

According to the present invention, after the diameter-increased region of the tube which is inserted into the tube-hole is reduced in diameter and is loosened, the region opposed to the groove of the tube-sheet is heated into the red-hot state and the tube is stretched in the axial direction, and the red-heated region is stretched to reduce the diameter and is cut off. With this configuration, when the region is heated into the red-hot state, heat transferring from the tube to the tube-sheet is small, and thus, the tube can effectively be heated, and when the red-heated region is stretched, the tractive force applied to the tube can effectively be applied to the red-heated region and with this, it is possible to stretch the red-heated region with a small tractive force to reduce its diameter, and thus, the diameter-increased portion formed on the region opposed to the groove can be reduced in diameter and the diameter-increased portion can be pulled out without being caught in the side wall of the groove. Further, since the tube is cut off at its portion which is inserted into the tube-hole, the tube after it is cut off can be pulled out in opposite sides of the tube-sheet. Therefore, even if the diameter-increased portion or the flare portion exists in the region of the tube outside the tube-sheet, it is unnecessary to remove the diameter-increased portion or the flare portion. Thus, the operation for removing the diameter-increased portion or the flare portion is unnecessary, and the tube-sheet is not damaged. Therefore, depending on the present invention, it is possible to remove the tube efficiently and reliably within a short time, and there is advantage that the labor is saved, the quality is maintained and safety is enhanced.

If the red heating operation of the region of the tube opposed to the groove is carried out by induction heating using an induction heating coil inserted in the tube, since rapid heat input is carried out, only a desired region can swiftly be heated into the red-hot state, and it is easy to control the temperature, and the tube can be removed more efficiently.

When the plurality of annular grooves are formed on the inner circumference of the tube-hole, regions of the tube which are opposed to the grooves can be simultaneously heated into the red-hot state, it is possible to reduce the diameters of the diameter-increased portions of the regions opposed to the grooves by one heating operation and one stretching operation, and it is possible to cut off one location of the red-heated region to pull out the tube, and time required for pulling the tube can be shortened.

When the tube is stretched in the axial direction and the red-heated region is stretched and reduced in diameter, it is preferable that a tractive force is applied to a portion of the tube located on the opposite side from the tip end with respect to the tube-sheet. With this configuration, since a length of this portion of the tube can freely be selected, it becomes easy to connect a device which applies the tractive force, i.e., a structure of the connecting mechanism to be used can be simplified, and the device used for carrying out the invention can be simplified.

The present invention is hereinafter described in more detail based on the best mode of the present invention.

BRIEF DESCRIPTION OF THE DRAWINGS

FIGS. 1(a), 1(b), 1(c) and 1(d) illustrates schematic sectional views of a tube fixed to a tube-sheet, showing a removing procedure of the tube in an embodiment of the present invention;

An embodiment of the invention for removing a tube 3 will be explained below. In the embodiment, as shown in FIG. 1(a), a tube 3 is inserted into a tube-hole 2, having one annular groove 4 formed on its inner circumference, of a tube-sheet 1, and the tube 3 is increased in diameter and is fixed in the tube-hole 2.

First, the inserted portion 3a of the tube 3 is heated, the inserted portion 3a which trends to thermally expand is compressively yielded by restraining by an inner surface of the tube-hole 2, then the inserted portion 3a is cooled to reduce a diameter of the inserted portion 3a, and the inserted portion 3a is loosened from the tube-hole 2 of the tube-sheet 1. This heating operation may be carried out using a gas torch from the inner surface of the tube. However, as the inserted portion 3a is heated more rapidly or swiftly, i.e., as a rise in the temperature of the tube-sheet 1 by heat transfer at the moment when a temperature of the inserted portion 3a reaches a predetermined temperature is smaller, the loosening margin can be increased. Therefore, an induction heating method, in which an induction heating coil is disposed in the inserted portion 3a and alternating current is supplied to the coil to heat the inserted portion 3a, is recommended. According to this induction heating method, even if the subsequent cooling operation is carried out by means of air-cooling, the loosening margin can sufficiently be obtained. For example, if the tube of 50.8 mmφ×3.2 mmt is heated to about 900° C. by power of about 25 kW×1 minute (this is varied depending upon the atmospheric temperature) by the induction heating method and then the tube is cooled by blowing air, the diameter of the tube is reduced by about 1%.

Figure 1:
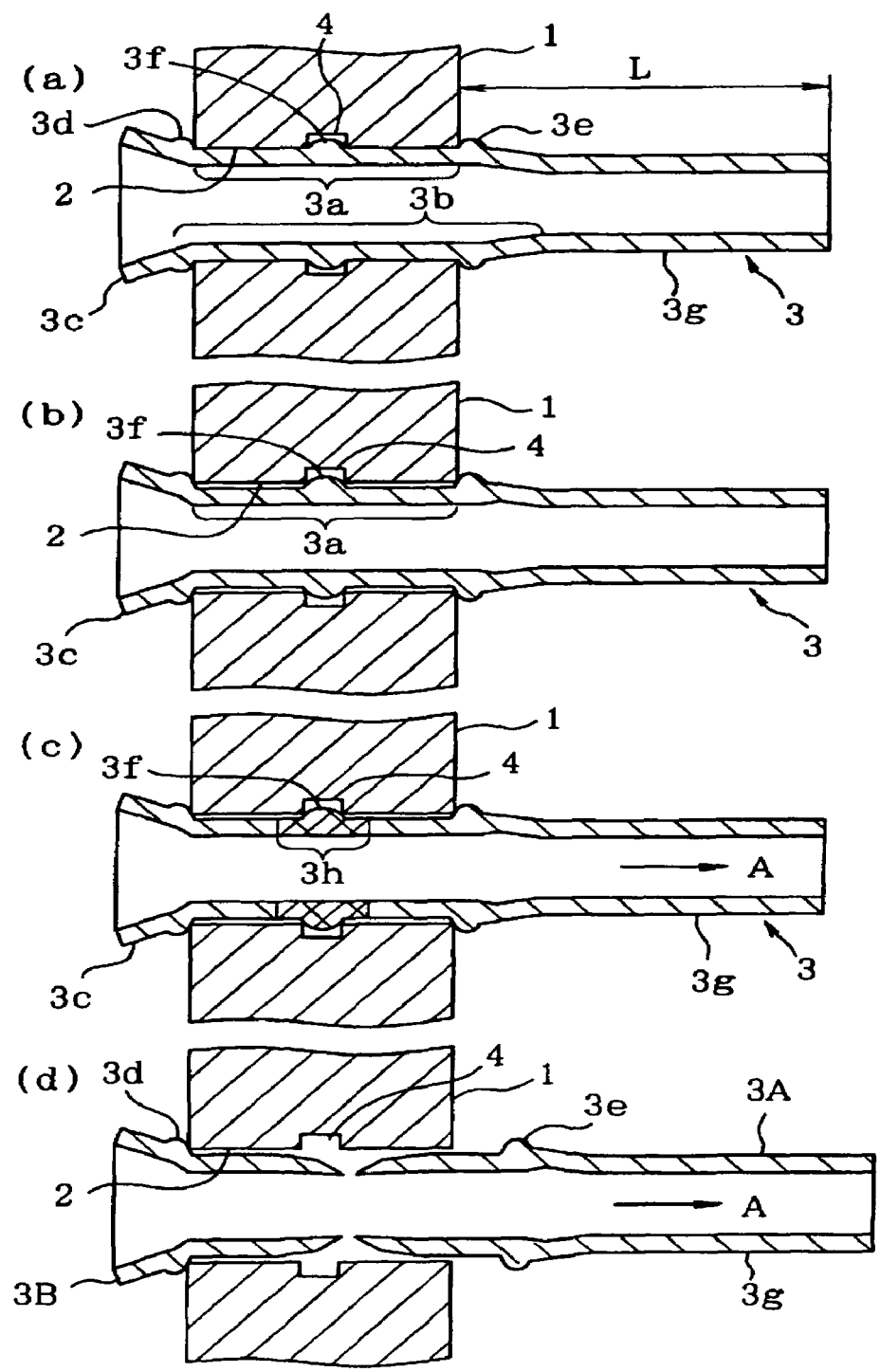
In FIG. 1, reference symbols 3a to 3f represent portions of the tube 3, the reference symbol 3a represents an inserted portion fixed to the inner circumference of the tube-hole 2, a reference symbol 3b represents a diameter-increased region, a reference symbol 3c represents a flare portion, and reference symbols 3d, 3e and 3f represent diameter-increased portions whose diameters are increased greater than the inner diameter of the tube-hole 2. As preparation before the removing method of the invention is carried out, a region of the tube 3 which is opposed from a tube tip end with respect to the tube-sheet 1 is cut off at a location separated from the tube-sheet 1 by an appropriate distance L. Here, the length L of a tube's portion which projects from the tube-sheet 1 on the opposite side from the tube tip end ("remaining-tube", hereinafter) 3g, is selected such that a space to connect a device for applying a tractive force (later-described as a traction-tool) can be obtained on the ("remaining-tube" 3g.

By loosening the inserted portion 3a by heating and cooling, the region which is restrained by the inner circumference of the tube-hole 2 of the tube-sheet 1 is reduced in diameter, but the diameter-increased portion 3f located in the groove 4 is not reduced in diameter so much. Therefore, the outer diameter of the diameter-increased portion 3f is still greater than the inner diameter of the tube-hole 2, and the tube 3 can not be pulled out as it is. Thereupon, after the above-described loosening operation is carried out, as shown in FIG. 1(c), the region 3h of the tube 3 including a portion opposed to the groove 4 is heated to the red-hot state so that the deformation resistance of the region 3h is largely reduced, and as shown in FIG. 1(d), the tube 3 is stretched in the axial direction, and the red-heated region whose deformation resistance is largely reduced is plastically deformed, i.e., stretched in the axial direction to reduce its diameter, and is further stretched to cut off the same.

This operation will further be explained below.

The region 3h which is heated to the red-hot state is determined such that when the region 3h is stretched in the axial direction, the diameter-increased portion 3f which is fitted in the groove 4 is reduced in diameter and comes out from the groove 4. The region 3h is not limited to a region that is strictly opposed to the groove 4, and the region 3h may slightly be narrower or wider. It is preferable that the width of the region 3h is as small as possible within a range in which the diameter-increased portion 3f can be pulled out from the groove 4 because a portion of the tube which is stretched and reduced in diameter is concentrated on the narrow range so that the diameter can be reduced efficiently and the tube can be swiftly cut off and thus, energy efficiency can be enhanced, but it is also preferable that the region is slightly wider so that even if there is an error in the heating position, the diameter-increased portion 3f can be red-heated.

Figure 2:
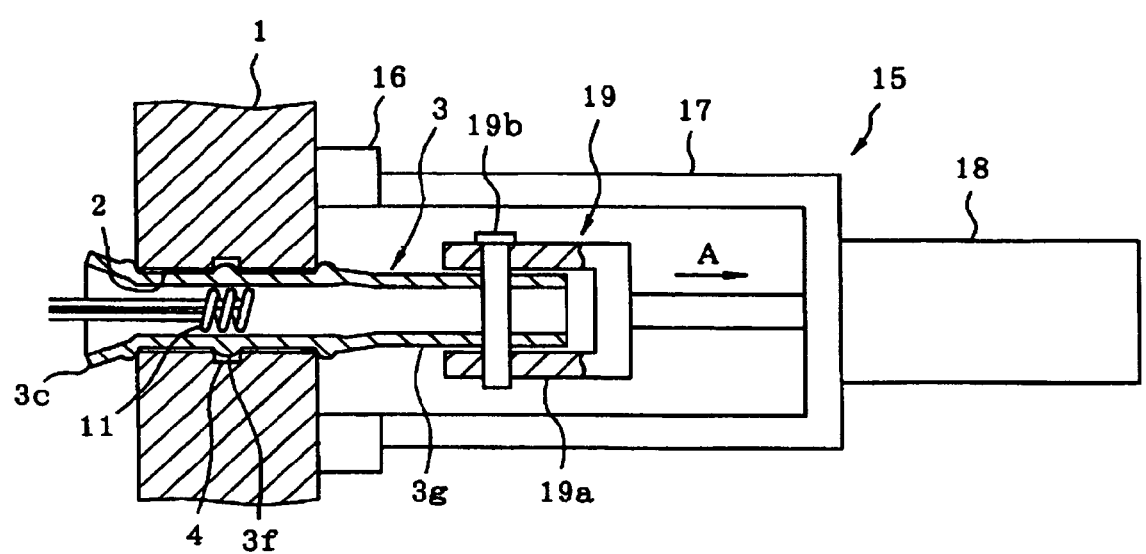
FIG. 2 illustrates a schematic side view and sectional view showing a traction-tool and an induction heating coil used for removing the tube in a state in which the tool and the coil is respectively set to the tube-sheet and the tube.

In this connection, it is preferable that the diameter-increased portion 3f is about 3 to 10 times of the width of the groove 4. In the illustrated embodiment, the region 3h is set wider than the width of the groove 4 so that even if there is a slight error in the heating position, the diameter-increased portion 3f can reliably be heated to the red-hot state. As the heating temperature of the region 3h is higher, the deformation resistance becomes smaller and the tractive force required for reducing the diameter and cutting the tube can be smaller, but consumed energy is increased. Considering these factors, the heating temperature is preferably about 800 to 1100° C. It is not always necessary to uniform the heating temperature of the region 3h, and a temperature distribution may be generated. In this case, it is preferable that a central portion of the diameter-increased portion 3f which is to be reduced in diameter is heated to the highest temperature. As the region 3h is heated by the rapid heat input within a shorter time, a desired region can preferably be brought into the red-hot state. From this point of view, direct heat by means of a gas torch is excellent heating means. However, the induction heating method capable of more rapid heat inputting is the most suitable. To carry out the induction heating as shown in FIG. 2 for example, an induction heating coil 11 is inserted and disposed into the tube 3 from the tip end side of the tube 3, and once alternating current is supplied to the induction heating coil 11, the tube region opposed to the induction heating coil 11 can swiftly be induction heated. When the region 3h of the tube 3 is heated, since the inserted portion 3a is loosened and is not in tight contact with the inner circumference of the tube-hole 2 of the tube-sheet 1, the heat transfer from the tube 3 to the tube-sheet 1 is suppressed and from this reason also, the region 3h can be heated to the high temperature swiftly. When the induction heating is utilized for a tube of about 50.8 mmφ×3.2 mmt, red heating for about 1000° C., which is suitable for reducing the diameter and cutting the tube off, can be carried out by current-supplying of about 28 kW×20 seconds.

As shown in FIG. 1(c) the tractive force for reducing the diameter of the region 3h and cutting the region 3h which was heated to the red-hot state may be applied by stretching the flare portion 3c in the axial direction of the tube by means of an appropriate jig, but preferably, the tractive force is applied by pulling the remaining-tube 3g in the direction of arrow A as illustrated. This is because that unlike the flare portion 3c, since the remaining-tube 3g can be long and have a desired length, a traction-tool for applying the tractive force can easily be connected to the remaining-tube 3g, i.e., a mechanism for connecting the traction-tool to the remaining-tube 3g can be simplified. The structure of the traction-tool which applies the tractive force to the tube is not limited only if the traction-tool can apply the tractive force to the tube, but it is preferable to use a traction-tool 15 as shown in FIG. 2. This traction-tool 15 comprises a frame 17 having a magnet 16 to be stuck to the tube-sheet 1, a driving device 18 such as a hydraulic cylinder held by the frame 17, and a connecting head 19 which is reciprocated by the driving device 18. The connecting head 19 includes a U-shaped member 19a and a pin 19b. The pin 19b is inserted into the through hole formed on U-shaped member 19a and the remaining-tube 3g to connect the U-shaped member 19a and the remaining-tube 3g to each other. The frame 17 has a large space at a position where the pin 19b is pulled in and out so that pin 19b can easily be attached and detached. In the connecting head 19 of this structure, to which the remaining-tube 3g is connected, it is necessary to form a hole through which the pin 19b is inserted into the remaining-tube 3g, but there is a merit that the structure is extremely simple. The connecting head 19 is not limited to this structure, and the remaining-tube 3g may be grasped by using a collect chuck.

As shown in the drawing, the traction-tool 15 having the above-described configuration is held by the tube-sheet 1 utilizing the magnet 16, the connecting head 19 is connected to the remaining-tube 3g, the driving device 18 is operated, a reaction force is applied to the tube-sheet 1, and a tractive force in the direction of arrow A can be applied to the remaining-tube 3g. This traction-tool 15 is mounted as shown in the drawing before the region 3h of the tube 3 is red heated.

In FIG. 1(c), after the region 3h of the tube 3 is heated to the red-hot state, the tractive force in the direction of arrow A is applied to the remaining-tube 3h by the traction-tool 15 shown in FIG. 2. At that time, the inserted portion 3a of the tube 3 is loosened from the tube-hole 2 of the tube-sheet 1, the tractive force applied to the remaining-tube 3g is effectively transferred to the region 3h of the red-hot state, the region 3h is increased axially and reduced in diameter. Therefore, the diameter-increased portion 3f which has been fitted in the groove 4 is reduced in diameter and comes out from the groove 4. Further, the region 3h is stretched and finally cut off as shown in FIG. 1(d). With this, the tube cut piece 3A on the side of the remaining-tube 3h is pulled out and removed from the tube-sheet 1. On the other hand, there is no portion of the remaining-tube cut piece 3B which is caught in the tube-hole 2, the cut piece 3B can also be pulled out and removed easily if it is pulled in the opposite direction. With the above-described operation, the tube fixed to the tube-sheet 1 can be removed.

In the above embodiment, after the region 3h is red heated, the tractive force is applied to the remaining-tube 3g and the red heated region 3h is reduced in diameter and cutoff. However, the present invention is not limited to this procedure. For example, the procedure in which the tractive force is kept on applying to the remaining-tube 3g, then in the state the region 3h is heated, is also adoptable.

Figure 3:
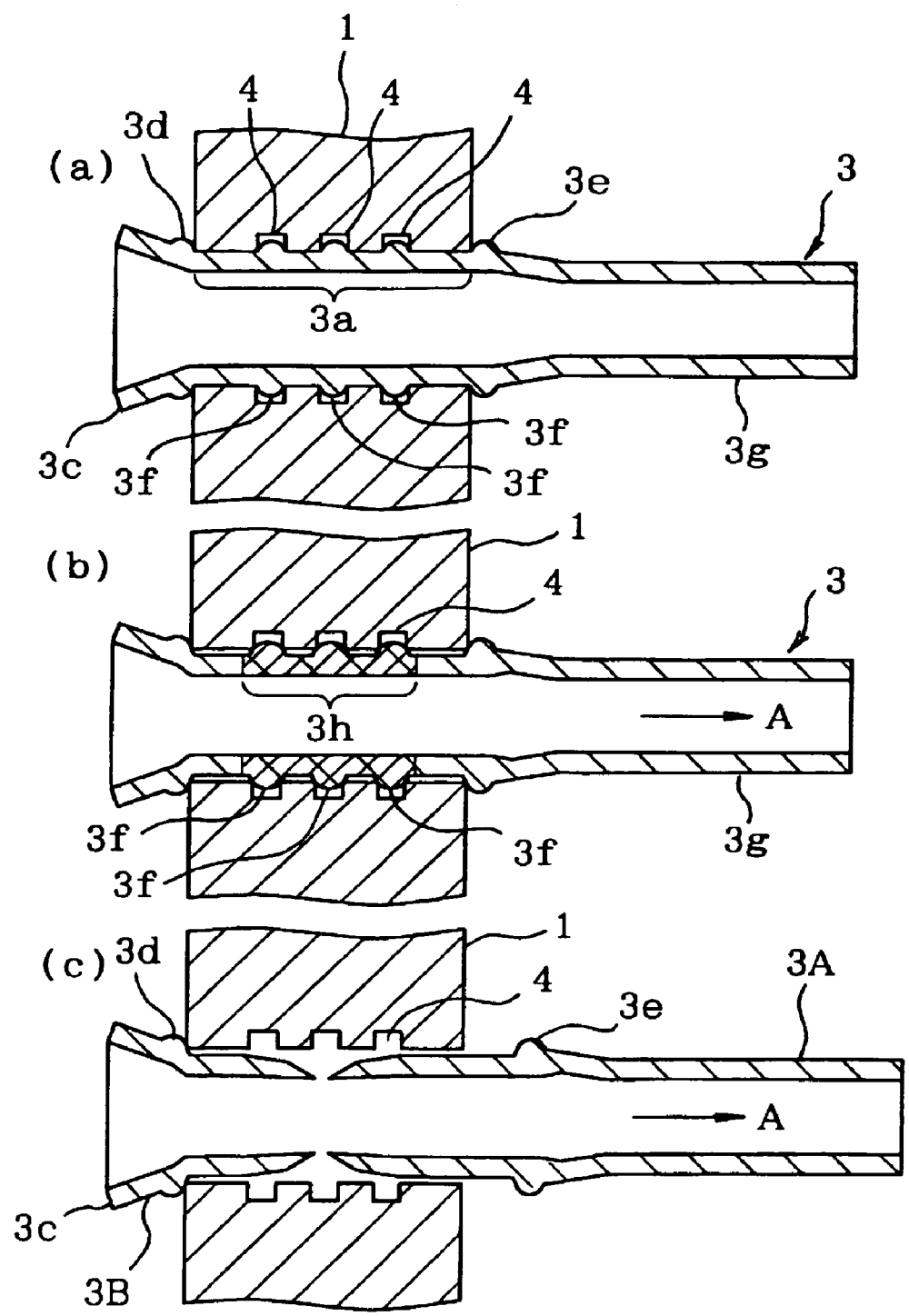
FIGS. 3(a), 3(b) and 3(c) illustrate schematic sectional views of the tube fixed to the tube-sheet, showing the tube removing procedure in other embodiments of the present invention.
Figure 4:
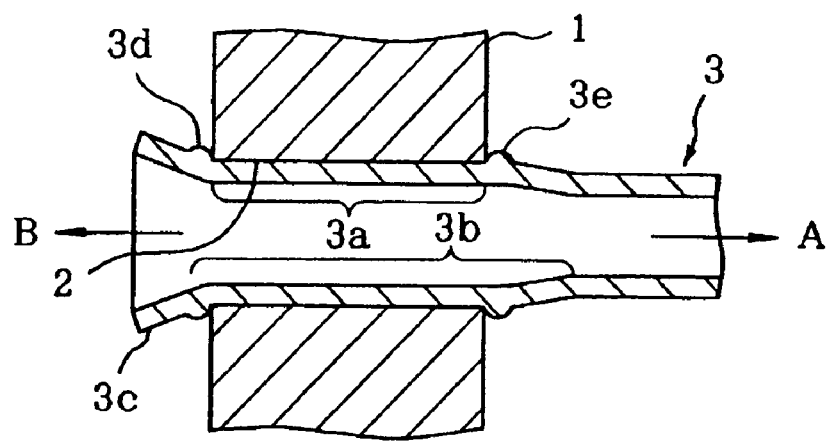
FIG. 4 illustrates a schematic sectional view showing the tube fixed to the tube-sheet.
Figure 5:
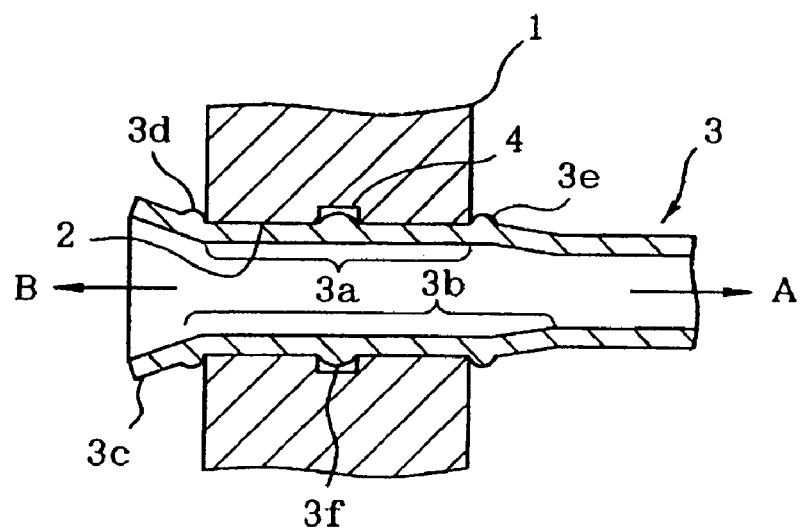
FIG. 5 illustrates a schematic sectional view showing other example of the tube fixed to the tube-sheet.

This embodiment corresponds to the case that one groove 4 is formed on the inner circumference of the tube-hole 2 of the tube-sheet 1, but without being limited to that case, the present invention also can be applied to the case that a plurality of grooves 4 are formed. FIG. 3 shows other embodiments in which three grooves 4 are formed on the inner circumference of the tube-hole 2. First, in FIG. 3(a), the inserted portion 3a of the tube 3 is loosened by heating and cooling, thereby, the inserted portion 3a is loosened as shown in FIG. 3(b). Next, the region 3h of the tube 3 which is opposed to the three grooves 4 is heated to the red-hot state, and in that case, either the region 3h is heated to the red-hot state and after that, the tractive force in the direction of arrow A is applied to the remaining-tube 3g, or the region 3h is heated to the red-hot state in a state that the tractive force in the direction of arrow A is kept on applying to the remaining-tube 3g. With this operation, the region 3h in the red-hot state is stretched axially and reduced in diameter, and each diameter-increased portion 3f comes out from the respective groove 4 and finally, the diameter-increased portion 3f is cut off as shown in FIG. 3(c). In this manner, the tube 3 can be divided into two tube cut pieces 3A and 3B, and the cut pieces can be pulled out and removed by pulling the cut pieces in the opposite directions.

As explained above, in the removing method of the present invention, the diameter-increased portion 3f which is fitted in the groove 4 formed in the inner circumference of the tube-hole 2 of the tube-sheet 1 is stretched axially and reduced in diameter, and is cut in the inserted portion 3a into the two tube cut pieces 3A and 3B, and they are pulled toward the opposite sides of the tube-sheet 1 and removed. Therefore, the tube can be removed without removing the flare portion 3c and the diameter-increased portions 3d and 3e which are formed on opposite sides of the tube-sheet 1, and there is a merit that the steps can be simplified correspondingly, and the tube-sheet 1 is not damaged which is prone to be caused when the diameter-increased portions 3d and 3e as well as the flare portion 3c are to be removed. The operation for red heating the region 3h of the tube to stretch the region 3h and to reduce its diameter is carried out only once. Therefore, as compared with the case in which the operation is repeated a plurality of times while changing the position as shown in the patent document 1, there is a merit that the operation is simple and can be carried out within a short time.

The removing method of a tube according to the present invention can be used for removing a tube in any device having a structure in which the tube is inserted into a tube-hole which is formed in an inner circumference of a tube-sheet and which has an annular groove and the tube is increased in diameter and is mounted. A representative example thereof is a case in which a boiler tube is removed from a steam drum and a water drum of the steam boiler, and a case in which a heat-exchange tube is removed from a tube-sheet in a shell-tube type heat exchanger.

The symbols in the drawings are summarized as follows: 1: tube-sheet; 2: tube-hole; 3: tube; 3a: inserted portion; 3b: region to be increased in diameter; 3c: flare portion; 3d, 3e and 3f: diameter-increased portion; 3g: remaining-tube; 3h: red-heated region; 3A and 3B: tube cut piece; 11: induction heating coil; 15: traction-tool; 16: magnet; 17: frame; 18: driving device; 19: connecting head; 19a: U-shaped member; and 19b: pin.

What is claimed is:

1. A method for removing a tube from a tube-sheet, comprising:
    heating an inserted portion of the tube in a tube-hole formed in a tube-sheet, and cooling the inserted portion to reduce a diameter of the inserted portion so as to loosen the tube from the tube-hole, the tube-hole having an annular groove formed on its inner surface, the tube having a diameter-increased portion on its outer surface, and the tube-hole being engaged with the diameter-increased portion; and
    subsequently heating an inside of the tube, where the diameter-increased portion is formed on the outer surface of the tube opposed to the groove, to a red-hot state, while the tube is concurrently stretched in the direction to pull out the tube from the tube-hole until the tube is cut-off at the circumferential direction of the tube.

2. The method according to claim 1, wherein the tube is heated to a red-hot state by means of induction heating by using an induction heating coil disposed in the tube, supplying an alternating current to said induction heating coil.

3. The method according to claim 2, wherein a plurality of annular grooves are formed on the circumference of the tube-hole, and wherein the tube are heated such that a region of the tube opposed to the grooves are simultaneously heated to the red-hot state.

4. The method according to claim 2, wherein when the tube is stretched in its axial direction, a tractive force is applied to a portion of the tube which is an opposite to a tip end of the tube with respect to the tube-sheet.

5. The method according to claim 1, wherein a plurality of annular grooves are formed on the circumference of the tube-hole, and wherein the tube are heated such that a region of the tube opposed to the grooves are simultaneously heated to the red-hot state.

6. The method according to claim 5, wherein when the tube is stretched in its axial direction, a tractive force is applied to a portion of the tube which is an opposite to a tip end of the tube with respect to the tube-sheet.

7. The method according to claim 1, wherein when the tube is stretched in its axial direction, a tractive force is applied to a portion of the tube which is an opposite to a tip end of the tube with respect to the tube-sheet.

* * * * *